(12) United States Patent
Erb et al.

(10) Patent No.: US 6,398,224 B1
(45) Date of Patent: Jun. 4, 2002

(54) METAL SEAL AND COATING MATERIAL FOR METAL SEALS

(75) Inventors: Wilfried Erb, Neu-Ulm; Konrad Gollmitzer, Günzburg; Alfred Weiss, Neu-Ulm, all of (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/485,409

(22) PCT Filed: Aug. 14, 1998

(86) PCT No.: PCT/DE98/02459
§ 371 (c)(1),
(2), (4) Date: Feb. 9, 2000

(87) PCT Pub. No.: WO99/09339
PCT Pub. Date: Feb. 25, 1999

(30) Foreign Application Priority Data

Aug. 14, 1997 (DE) .......................................... 197 35 390

(51) Int. Cl.[7] ................................................. F02F 11/00
(52) U.S. Cl. ..................... 277/592; 277/627; 277/652; 277/944
(58) Field of Search ................................ 277/592, 627, 277/650, 652, 936, 944

(56) References Cited

U.S. PATENT DOCUMENTS

| | | | | |
|---|---|---|---|---|
| 2,116,000 A | * | 5/1938 | Peterson | |
| 2,753,199 A | * | 7/1956 | Victor | |
| 4,325,559 A | * | 4/1982 | Czernik et al. | |
| 4,402,518 A | * | 9/1983 | Locacius | |
| 4,508,777 A | * | 4/1985 | Yamamoto et al. | 428/280 |
| 4,681,800 A | | 7/1987 | Zerfass et al. | |
| 4,748,075 A | | 5/1988 | Beyer et al. | |
| 5,472,995 A | * | 12/1995 | Kaminski et al. | 523/155 |
| 5,615,897 A | * | 4/1997 | Akita | |
| 5,622,372 A | * | 4/1997 | Fujisawa et al. | 427/410 |
| 5,731,040 A | * | 3/1998 | Akita | 427/410 |
| 6,139,024 A | * | 10/2000 | Yakushiji et al. | 277/592 |

FOREIGN PATENT DOCUMENTS

| | | |
|---|---|---|
| DE | 32 32 255 | 3/1984 |
| DE | 34 23 286 | 1/1986 |
| DE | 35 21 138 | 5/1986 |
| DE | 37 35 634 | 5/1989 |
| DE | 3802090 A1 | * 8/1989 |
| DE | 38 14 997 | 9/1989 |
| DE | 19619708 A1 | * 11/1996 |
| DE | 196 19 709 | 11/1996 |
| JP | 7-293693 | * 11/1995 |
| JP | 8-93920 | * 4/1996 |
| JP | 8-312786 | * 11/1996 |
| JP | 8-312787 | * 11/1996 |
| JP | 9-11363 | * 1/1997 |

OTHER PUBLICATIONS

Gasket for Engine from Patent Abstracts of Japan, Application # 64–192285 dated Mar. 12, 1991.
Derwent English abstracts of DE 32 32 255 and DE 35 21 138.

* cited by examiner

Primary Examiner—Anthony Knight
Assistant Examiner—Alison K. Pickard
(74) Attorney, Agent, or Firm—Rader, Fishman & Grauer PLLC

(57) ABSTRACT

The invention relates to a metal seal, which is fitted with a coating containing 10 to 60 wt. % of at least one elastomer, 5 to 50 wt. % of at least one inorganic fiber, 0.5 to 20 wt. % of at least one organic fiber, 10 to 80 wt. % filling material. The part by weight ratio of the at least one elastomer in relation to the part by ratio sum of the at least one inorganic fiber and the at least one organic fiber ranges from 1:1.1 and 1.5:5. The invention further relates to the coating material.

10 Claims, 2 Drawing Sheets

Figures 1A, 1B:
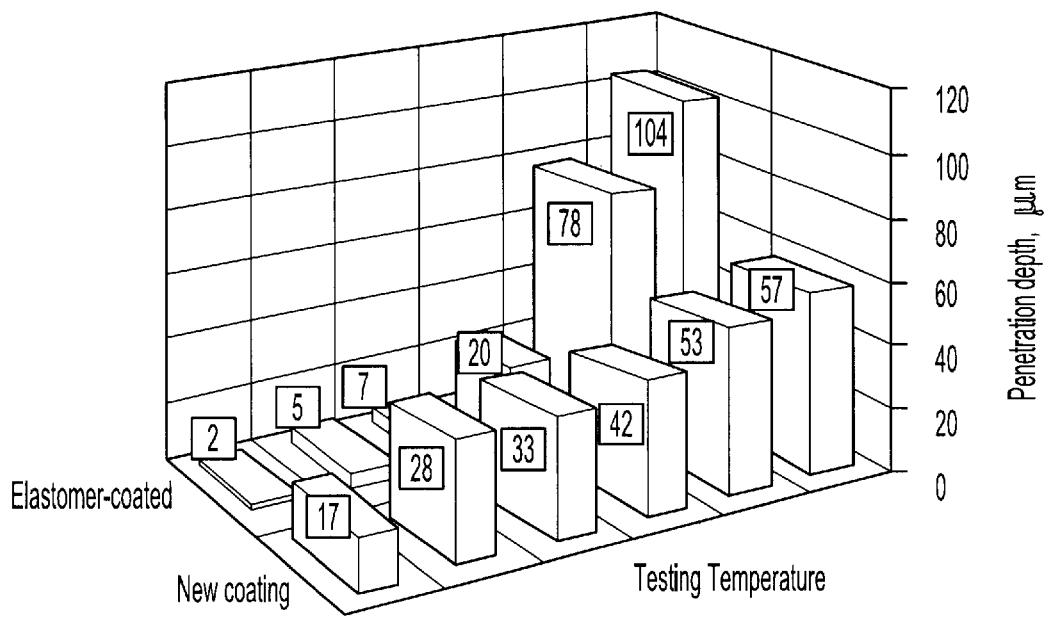

| Temperature | New coating | Elastomer-coated |
|---|---|---|
| 50° | 17 | 2 |
| 100° | 28 | 5 |
| 150° | 33 | 7 |
| 200° | 42 | 20 |
| 250° | 53 | 78 |
| 300° | 57 | 104 |

Pressure : 75 N/mm$^2$
Compression Time : 30min
Temperature : See diagram

METAL SEAL AND COATING MATERIAL FOR METAL SEALS

The invention relates to a metal seal with a coating applied thereon and to a material for coating metal seals.

Up to a few years ago, soft material seals were widespread which generally consisted of a planar metal carrier and soft material layers applied to both sides of the carrier. The soft material layers with layer thicknesses of respectively 0.80 mm and more frequently contained the very stable and temperature-resistant asbestos fibres combined with a low proportion of elastomer binding agent. In the course of the ban on asbestos, however, the asbestos fibre was replaced by other fibres stabilising the soft material layers.

By embossing the soft material, soft material seals can be formed in such a way that even pressure distribution and useful sealing properties can be realised in the fitted state of the seal without additional resilient elements such as elastomer beads. Generally, however, as a result of the low compressibility per unit thickness of the soft material, the embossing of the soft material was combined with the additional use of resilient elements. Beading of the soft material seals could not be carried out, since the soft material tends to break away.

In recent times, soft material seals have been superseded by thinner metal seals. These encompass one or more metal layers, the sides of the metal seals facing the areas to be sealed generally having a thin elastomer coating. Since the thin elastomer coating only has inadequate adaptability in comparison with soft material layers, metal seals are predominantly provided with beads.

What is disadvantageous about such metal seals is, on the one hand, the fact that the elastomer coating materials used have insufficient stability especially at higher temperatures. Typical elastomer coating materials show for example penetration depths of over 100 μm at 300° C. and a compression of 75 N/mm$^2$ for 30 min (RPM 510-B). On the other hand, these elastomer coatings have very low compressibility and thus poor adaptability. As a result of this fact, it is necessary for the metal seals to be provided with additional resilient elements, e.g. beads.

Proceeding from these and further disadvantages of prior art, the object underlying the invention is to make available a coated metal seal and a coating material, which have good properties within a wide temperature range and especially also at high temperatures such as occur for example in applications in the automobile field or in industrial applications. The seal should be capable of being beaded, but especially also be usable in a non-beaded state. Therefore, besides excellent adaptability, the coating material must also have improved temperature-resistance in comparison with conventional coating materials.

A metal seal according to the present invention has advantageous properties over a wide temperature range. Thus, at low temperatures, the metal seal with the coating material according to the invention has considerably higher compressibility and thus better sealing properties then conventional, purely elastomer coatings. For this reason, sealing beads can for example be dispensed with in many applications, which noticeably reduces the manufacturing costs for seals. Advantageously, the coating material according to the invention has, moreover, substantially better stability under high temperatures than a purely elastomer material. Thus good sealing properties can be achieved in a wide temperature range up to quite high temperatures.

The advantageous properties of the proposed seal rest first of all in the new type of coating composition which makes it possible to realise particularly thin layers (0.05 to 0.40 mm) without the excellent properties being lost. Functional seals with a layer thickness of between 0.1 and 0.2 can even be realised with the coating material. The coating composition contains, besides a proportion of elastomer, especially a mixture of at least one organic and at least one inorganic fibre. The preferably fibrillated organic fibres give the coating material good structural stability, whilst the inorganic fibres improve the resistance to temperature and pressure. For an optimal combination of these characteristics, the proportion of the organic fibres should be in the region of 0.5 to 20 wt. %, preferably 1 to 5 wt. %, and the proportion of the inorganic fibres should be in the region of 5 to 50 wt. %, preferably 20 to 25 wt. %. The proportion of elastomer in the coating material should be between 10 and 60 wt. %, preferably between 20 and 35 wt. %. The proportion of fillers moves in the range between 10 and 80 wt. % and preferably between 15 and 55 wt. %. Additional chemicals such as sulphur or sulphur donors for vulcanising, accelerators or age-protecting agents are generally added in a proportion of roughly 2 wt. %.

In comparison with coating materials with only a single fibre component, coating materials with the organic/inorganic fibre mixture have noticeably better characteristic values. The improved properties such as compressibility, recovery and stability are particularly marked if the ratio of the weight percentage of the at least one elastomer to the sum of the weight percentages of the at least one inorganic and the at least one organic fibre is in the range between 1:1.1 and 1.5:1 and is preferably roughly 1:1.

The correct choice of this ratio is significant because the proportion of the at least one elastomer must be so selected that all the fibres are surrounded with elastomer in order to create a stable compound with embedded fibres. If the proportion of elastomer is too low, accumulations of fibres occur between which are to be found free spaces not occupied by elastomer. These free spaces can be seen as pores which, above all with low layer thicknesses such as are used in metal seals for example, can lead to cross-sectional leakage of the layer.

Figure 2A:
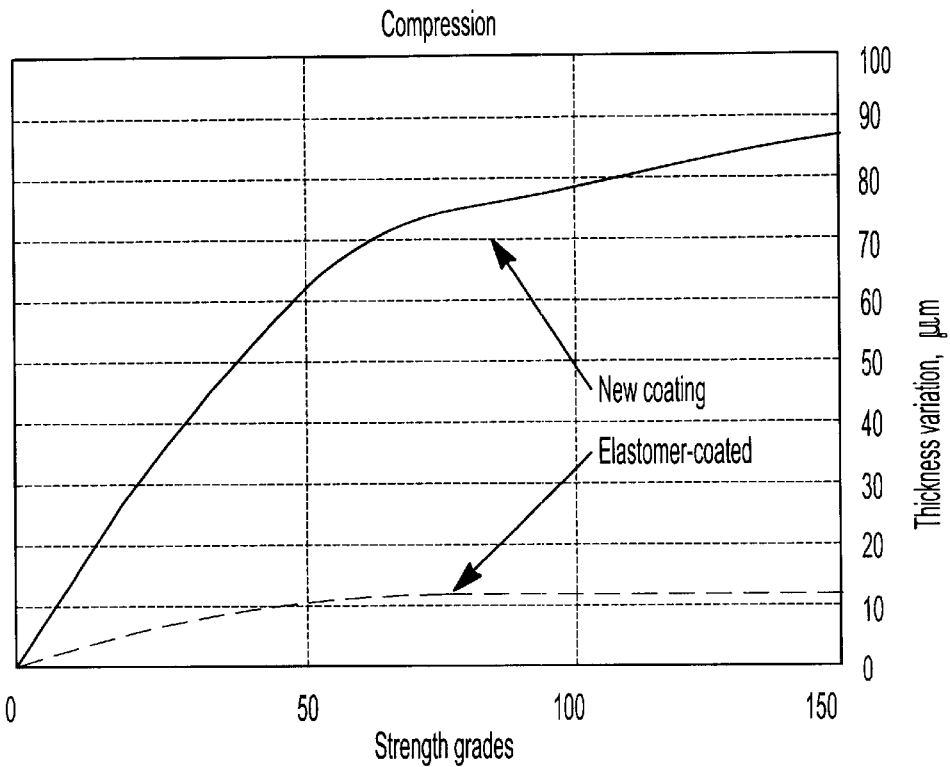
Figure 2B:
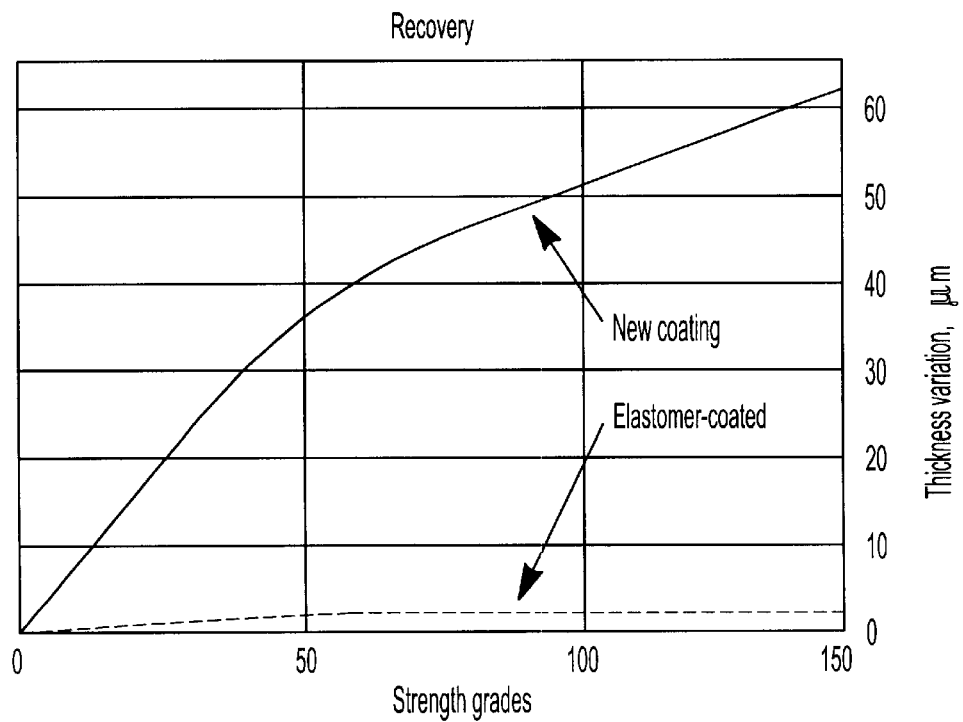

However, if the proportion of elastomer is selected too high, a loss of stability occurs. In FIGS. 1, 2a and 2b can be clearly recognised, for the borderline case of a purely elastomer coating, that resistance to temperature and pressure drop with too high a proportion of elastomer.

The coating according to the invention is applied at least to one outer surface of a metal seal, namely on the side facing the area to be sealed. Preferably, both outer surfaces are coated over their whole area. In relation to the number of metal layers, the invention is not subject to any limitation. Preferred, however, are single-layer metal seals of the most varied geometry, which depends on the respective requirements. For certain applications, consideration can also be given to not applying the coating material over the whole area in some regions.

According to the invention, the metal layers are understood as metal and metalations such as are already known from prior art for the manufacture of cylinder head gaskets. Metal materials of this type are, for example, spring steel or steel plate having different alloy components. The metal seals of the invention are exclusively seals manufactured from smooth-surfaced metal layers. The invention thus expressly excludes so-called "perforated core".

According to the invention, the procedure is that the coating material according to the invention is applied to the smooth-surfaced metal layers. Preferably, before the application of the coating material, at least one further coating is applied which is either a primer, an adhesive layer and/or a coupling layer. By this means, better adhesion of the coating material to the smooth-surfaced sheet metals is achieved. The application of the coating material to the metal layers can take place by means of techniques known per se from prior art and is advantageously so carried out that the material is applied as a free-flowing mass, e.g. by rolling on to the metal layer. It is also possible that a corresponding viscosity is set such that the mass can then be applied to the outer surface of the metal by screen printing.

After the coating material has been applied, stamping and possibly beading take place. It is technically also possible for stamping and beading to take place in one process.

Further advantages and developments of the invention arise from the figures and the embodiments. The figures show:

FIG. 1 the thermal-mechanical stability of the coating according to the invention in comparison with a purely elastomer coating, and FIGS. 2a and 2b the static behaviour compression/recovery of the coating according to the invention in comparison with a purely elastomer coating.

In FIG. 1, the penetration depth of the coating according to the invention is represented in μm according to RPM 510-B in comparison with a conventional, purely elastomer coating at a compression of 75 N/mm$^2$ and a process time of 30 min. The good compressibility of the coating according to the invention, even at low temperatures, and the good stability at higher temperatures can be clearly recognised.

In FIG. 2a (Compression) and FIG. 2b (recovery) is represented the assessment of load and relief according to RPM 511 for the coating material according to the invention and a conventional coating by way of comparison The coating according to the invention has, besides higher compressibility, significantly improved recovery.

Suitable as elastomers for the coating material according to the invention are, for example, nitrile rubber, chloroprene rubber, acrylic rubber, fluorinated rubber and EPDM. The at least one inorganic fibre is preferably selected from mineral fibres, ceramic fibres, basalt fibres, glass fibres and rock wool. Aramid or cellulose fibres are preferably used as the organic fibres, although other fibres, e.g. made of polyamide or polyester, are also suitable. As fillers, preferably finally divided materials with a high specific surface are used. Kaolin, talc, graphite, carbon black, rock meal, feldspars and silicates may be mentioned by way of example.

In addition to the coating described, the seal according to the invention can have additional layers. Thus a primer, adhesive and/or coupling layer can be arranged between the carrier material and the coating according to the invention. There can for example be another adhesive layer or a non-stick layer on the coating according to the invention.

The coating material finds application above all in regions which are exposed to higher mechanical and thermal stress, e.g. induction pipes, oil sumps, gearbox flanges, valve screws, pumps, compressors and axles. The coating material can also be used for cylinder head gaskets.

Several examples of compositions are depicted below:

| Composition 1: | |
|---|---|
| Nitrile rubber | 35 % |
| Vulcanising chemicals | 2 % |
| Mineral fibres | 32 % |
| Aramid fibres | 3 % |
| Fillers | 28 % |
| Composition 2: | |
| Nitrile rubber | 31 % |
| Vulcanising chemicals | 2 % |
| Mineral fibres | 28 % |
| Aramid fibres | 2 % |
| Fillers | 37 % |
| Composition 3: | |
| Nitrile rubber | 40 % |
| Vulcanising chemicals | 2 % |
| Mineral fibres | 35 % |
| Aramid fibres | 5 % |
| Filler | 18 % |
| Composition 4: | |
| Nitrile rubber | 30 % |
| Vulcanising chemicals | 2 % |
| Mineral fibres | 25 % |
| Aramid fibres | 5 % |
| Filler | 38 % |

What is claimed is:

1. A metal seal comprising at least one metal layer and at least one coating layer applied to an outer surface of the metal layer, wherein the coating layer has a thickness of 0.05–0.40 mm and includes:

10–60 weight % of an elastomer,

5–50 weight % of an inorganic fibre, 0.5–20 weight % of an organic fibre,

10–80 weight % fillers, in the absence of cork particles, wherein the ratio of the weight percentage of the at least one elastomer to the sum of the weight percentages of the at least one inorganic fibre and the at least one organic fibre is in the range between 1:1.1 and 1.5:1.

2. The seal of claim 1, wherein the at least one elastomer is selected from nitrile rubber, chloroprene rubber, acrylic rubber, fluorinated rubber and EPDM.

3. The seal of claim 1, wherein the at least one inorganic fibre is selected from mineral fibres, ceramic fibres, basalt fibres, glass fibres and rock wool.

4. The seal of claim 1, wherein the at least one organic fibre is a fibrillated fibre.

5. The seal of claim 1, wherein the at least one organic fibre is an aramid fibre, a cellulose fibre, a polyamide fibre or a polyester fibre.

6. The seal of claim 1, wherein the fillers are selected from kaolin, talc, graphite, carbon black, rock meal, feldspars and silicates.

7. The seal of claim 1, further comprising a beaded seal.

8. The seal of claim 1, further comprising an additional at least one layer between the metal layer and the coating layer.

9. The seal of claim 8, wherein the additional at least one layer is a primer layer, an adhesive layer or a coupling layer.

10. A metal seal comprising at least one metal layer and at least one coating layer applied to an outer surface of the metal layer, wherein the coating layer has a thickness of 0.05–0.40 mm and includes:

10–60 weight % of a nitrile rubber,

5–50 weight % of a mineral fibre, 0.5–20 weight % of an aramid fibre,

10–80 weight % fillers, wherein the ratio of the weight percentage of the at least one elastomer to the sum of the weight percentages of the at least one mineral fibre and the at least one aramid fibre is in the range between 1:1.1 and 1.5:1.

* * * * *